United States Patent [19]
Shoji et al.

[11] Patent Number: 6,002,583
[45] Date of Patent: Dec. 14, 1999

[54] PORTABLE COMPUTER PROVIDED WITH REMOVABLE BATTERY PACK

[75] Inventors: Takahashi Shoji, Saitama; Mukaijima Katsutoshi, Tokyo; Arai Isao; Uchida Toshiaki, both of Saitama, all of Japan

[73] Assignee: Citizen Watch Co., Ltd., Tokyo, Japan

[21] Appl. No.: 09/016,687

[22] Filed: Jan. 30, 1998

[30] Foreign Application Priority Data

Jan. 31, 1997 [JP] Japan .................................. 9-031511
Jan. 31, 1997 [JP] Japan .................................. 9-031513

[51] Int. Cl.⁶ .............................. G06F 1/16; H05K 7/10; H05K 7/16
[52] U.S. Cl. ........................... 361/683; 361/727
[58] Field of Search ..................... 364/708.1; 361/727, 361/683

[56] References Cited

U.S. PATENT DOCUMENTS

| | | | |
|---|---|---|---|
| 5,058,045 | 10/1991 | Ma | 364/708.1 |
| 5,107,401 | 4/1992 | Youn | 361/683 |
| 5,239,731 | 8/1993 | Lu | 361/380 |
| 5,243,549 | 9/1993 | Oshiba | 364/708.1 |
| 5,293,300 | 3/1994 | Leung | 361/683 |
| 5,390,075 | 2/1995 | English et al. | 361/683 |
| 5,583,744 | 9/1995 | Oguchi et al. | 361/683 |
| 5,594,617 | 1/1997 | Foster et al. | 361/683 |

FOREIGN PATENT DOCUMENTS

| | | |
|---|---|---|
| 2145423 | 12/1990 | Japan . |
| 3119616 | 5/1991 | Japan . |
| 3207226 | 9/1991 | Japan . |
| 4131890 | 6/1992 | Japan . |
| 4242066 | 8/1992 | Japan . |
| 4299023 | 10/1992 | Japan . |
| 4131889 | 12/1992 | Japan . |
| 4355083 | 12/1992 | Japan . |
| 5003027 | 1/1993 | Japan . |
| 5087626 | 1/1993 | Japan . |
| 5010814 | 2/1993 | Japan . |
| 5030919 | 4/1993 | Japan . |
| 5064943 | 8/1993 | Japan . |

OTHER PUBLICATIONS

U.S. patent application No. 08/961,188, Oguchi et al. filed Oct. 30, 1997, a cont. of U.S. patent No. 5,583,744.

Primary Examiner—Leo P. Picard
Assistant Examiner—John D. Reed
Attorney, Agent, or Firm—Loeb & Loeb, LLP

[57] ABSTRACT

One of multiple types of battery packs may be selected and mounted on the main body of a portable computer. The battery pack mounted on the main body can be rotated in reaction to the main body and, according to the rotation position thereof, can be in a position where the bottom surface of the main body and the bottom surface of the battery pack form a single plane or a position where the back of the main body is lifted and the main body is inclined toward the user.

20 Claims, 12 Drawing Sheets

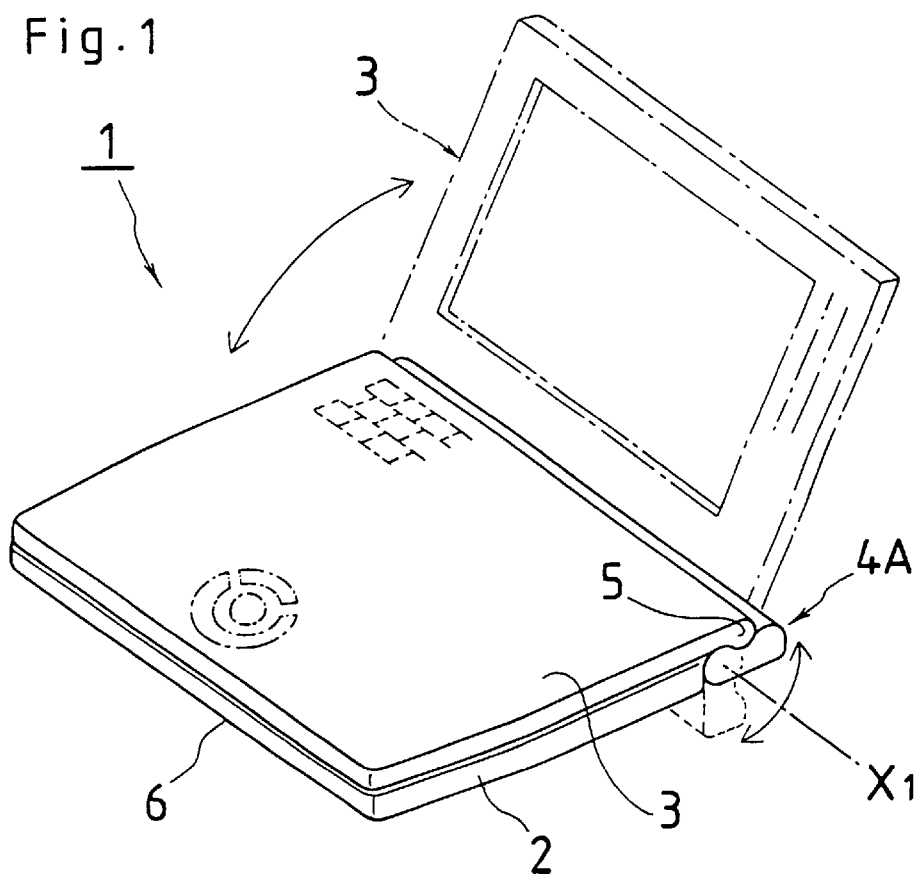
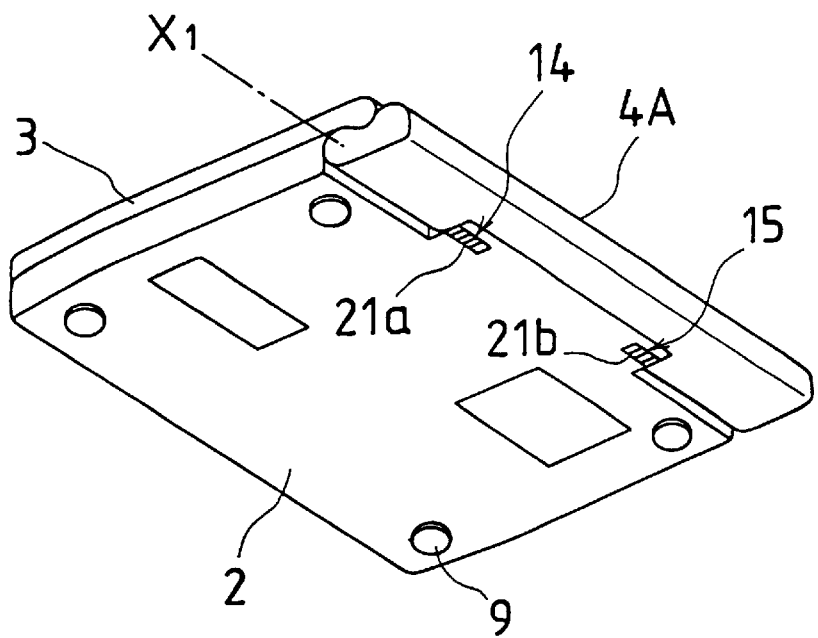

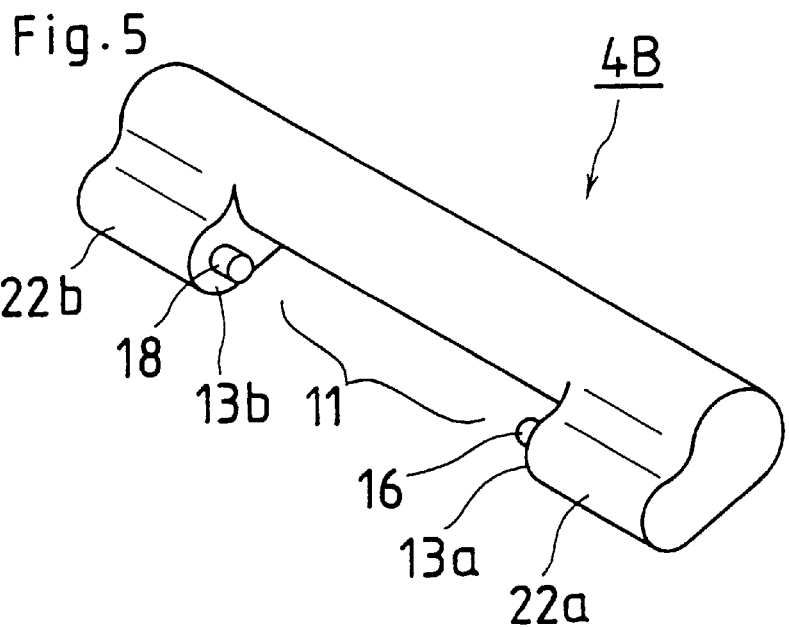
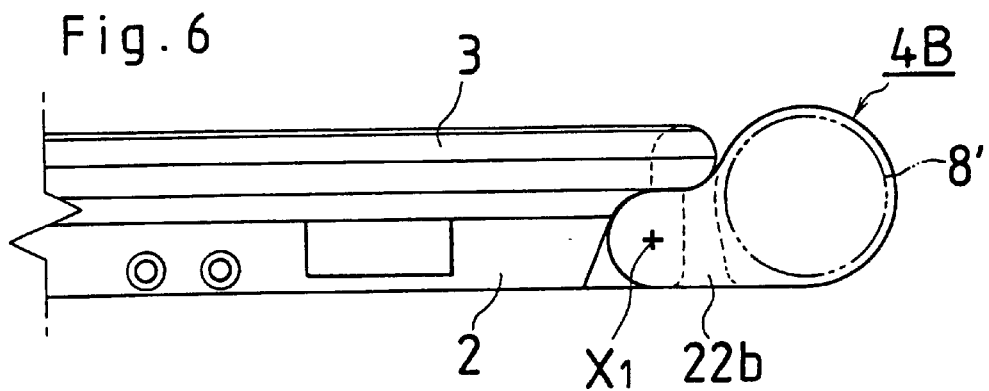
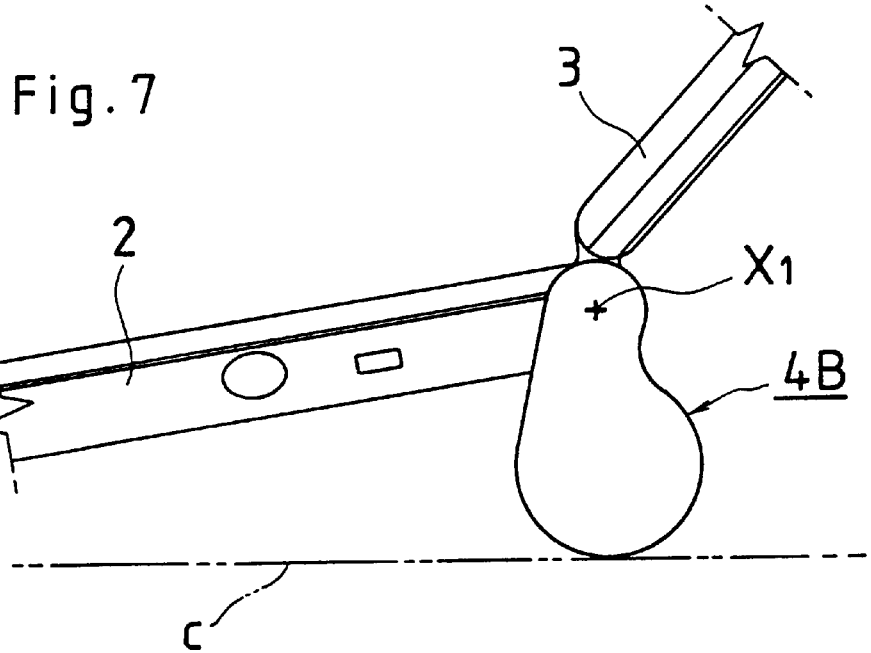

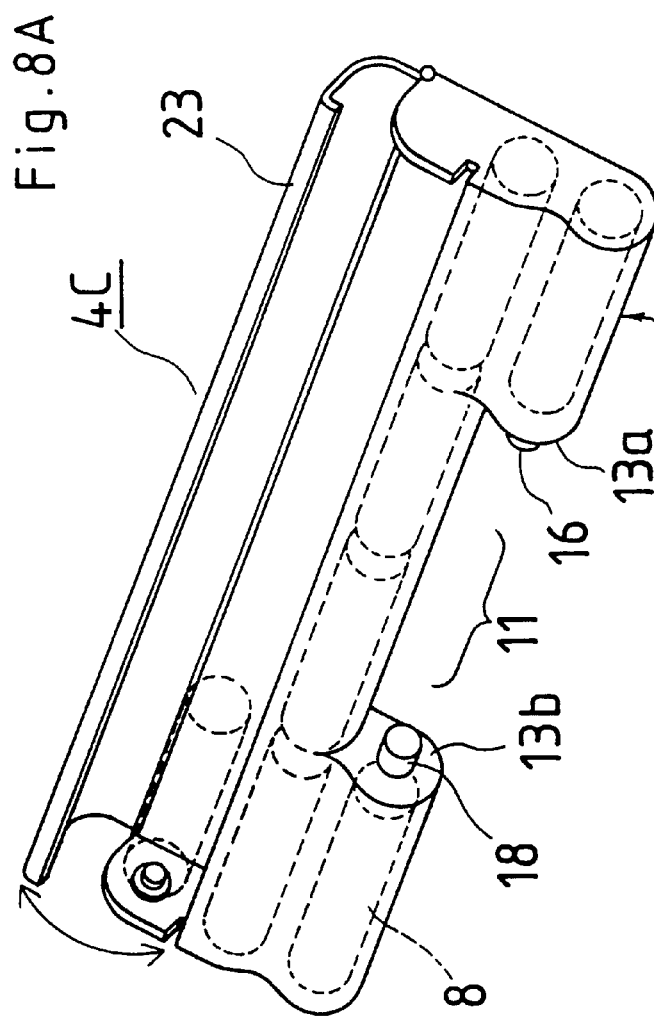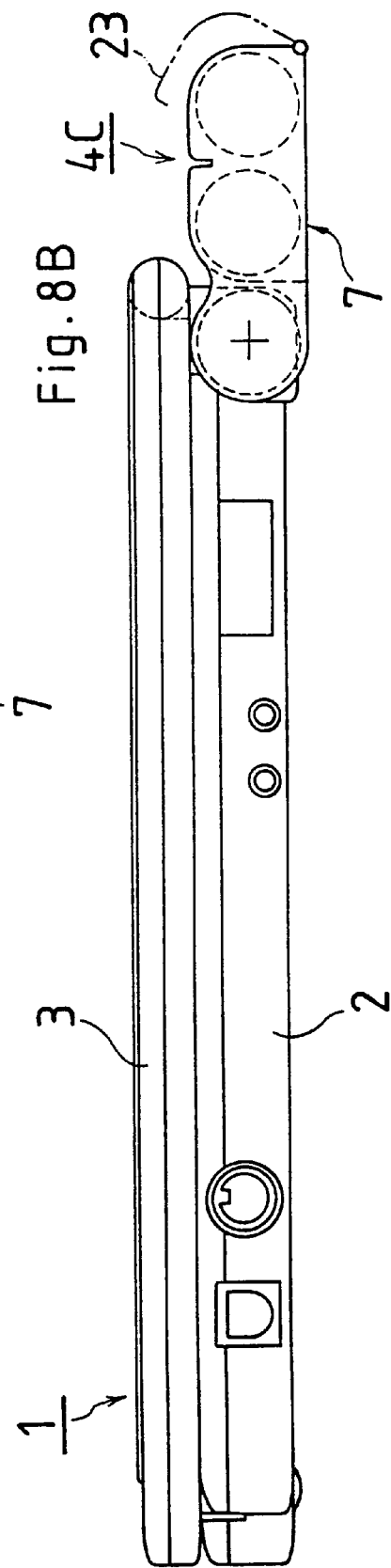

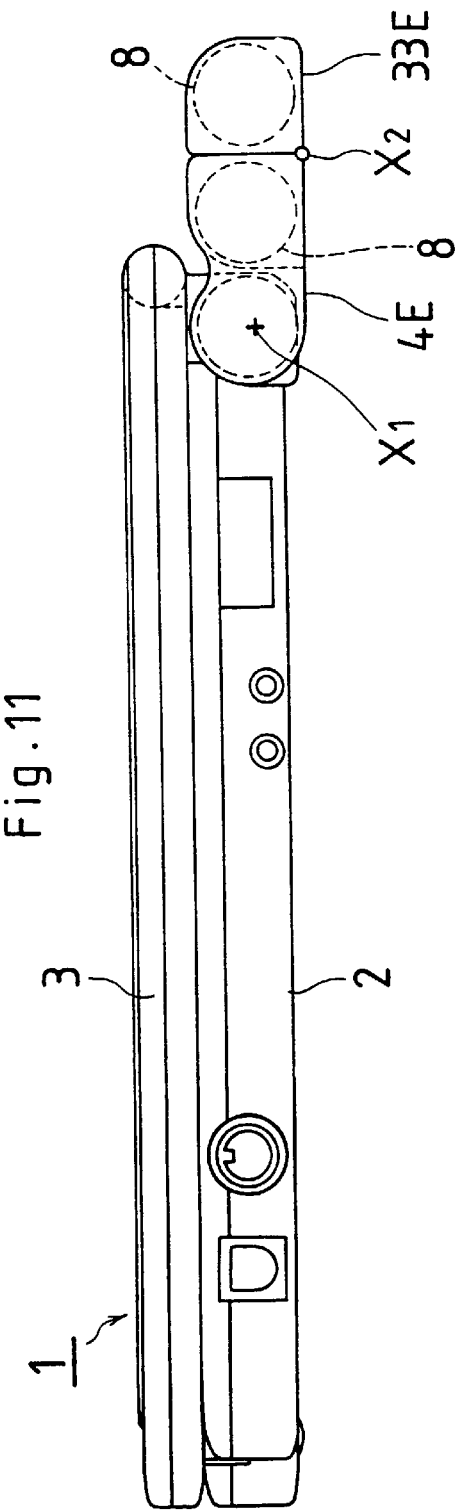
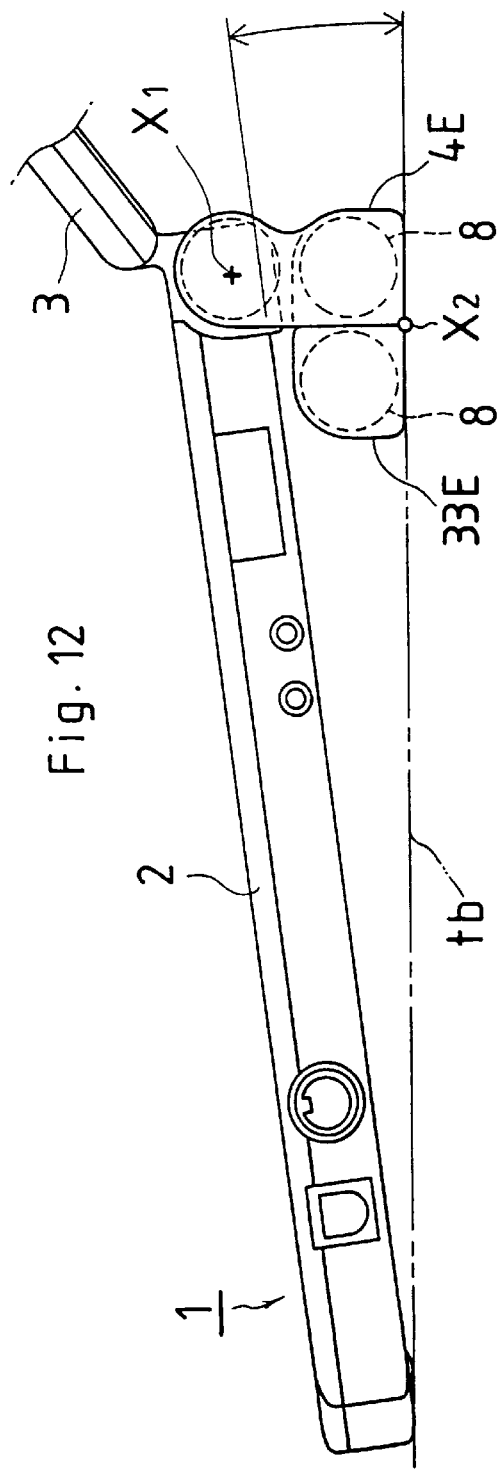

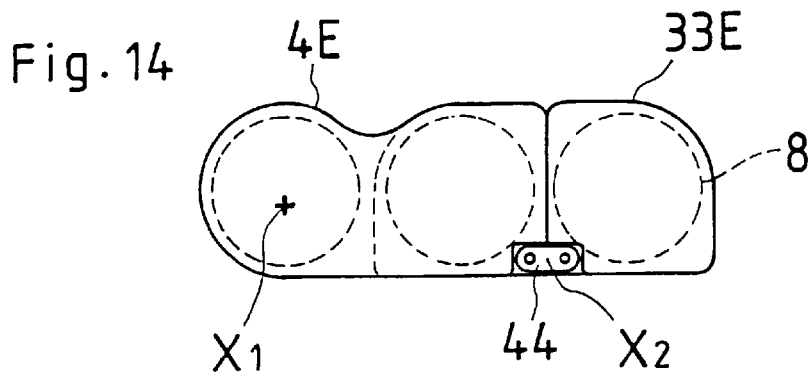
Fig. 14
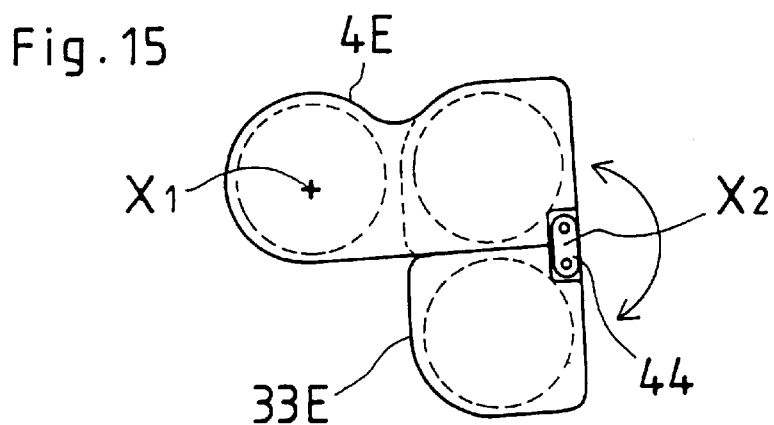
Fig. 15
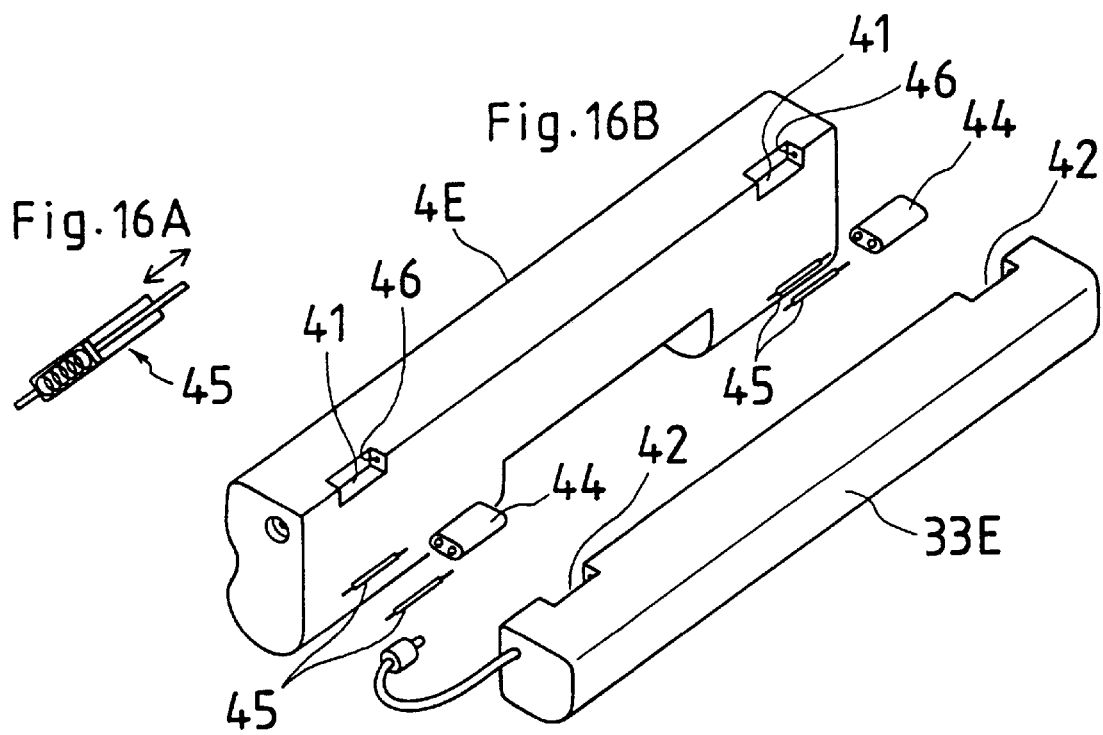
Fig. 16A
Fig. 16B 6,002,583

1

PORTABLE COMPUTER PROVIDED WITH REMOVABLE BATTERY PACK

BACKGROUND OF THE INVENTION

1. Field of the Invention

The present invention relates to a portable computer wherein a battery pack is removably installed.

2. Description of the Related Art

Portable computers, wherein a battery pack housing a plurality of batteries is installed, are widely used. The portable computer itself is limited in form, such as being small, lightweight, and thin, because of the portability thereof. At the same time, it is desirable that the battery pack installed thereon be able to house enough batteries to supply the necessary power and not make the entirety unwieldy when installed on the portable computer.

Some users of portable computers prefer that the size of the entire portable computer on which the battery pack is mounted be as small as possible, even if the capacity of the batteries housed in the battery pack is low (even if the usage time is short). Oppositely, however, some users do not care if the total size of the portable computer on which the battery pack is mounted is rather large, but prefer that the capacity of the batteries housed in the battery pack be large (that usage time be long).

At the present time, the number of batteries which can be housed in the battery pack is certain, because the structures are such that only specific battery packs can be mounted on specific types of portable computers. Consequently, increasing the capacity of batteries housed in the battery pack and lengthening usage time is not possible with such battery packs.

OBJECTS AND SUMMARY OF THE INVENTION

It is an object of the present invention to provide a portable computer provided with removable battery pack allowing selective installation of a battery pack, wherein the number, size, or capacity of batteries contained therein may be varied, on the main body of a specific type of portable computer.

In order to attain the foregoing object, a portable computer provided with a removable battery pack, according to the present invention, comprises a computer main body which is portable and is provided with a body side mounting portion, and a plurality of battery packs which are each provided with a pack side mounting portion having a structure which engages with the main body side mounting portion of said computer main body; wherein any one of said plurality of battery packs is removably mounted on said computer main body by engagement of the pack side mounting portion with the body side mounting portion of said computer main body.

The aforementioned plurality of battery packs comprises battery packs housing one row or two or more rows of batteries of a certain size, and further comprises battery packs housing different numbers of rows of batteries of a size the same or different therefrom. [This plurality of battery packs] also comprises battery packs housing one row or two or more rows of batteries of a certain size and further comprises battery packs housing the same or different numbers of rows of batteries of a size different therefrom. Furthermore, [this plurality of battery packs] also comprises a main battery pack housing one row or two or more rows of batteries of a certain size and the combination of a main battery pack with a supplementary battery pack, wherein a supplementary battery pack, housing one row or two or more rows of batteries of a size the same or different therefrom, is mounted removably on the aforementioned main battery pack and wherein the batteries of both are electrically connected.

As above, with the present invention, it is possible to select and mount on the same type of computer body the best [battery pack], according to usage conditions, portability conditions, and so forth, from among various types (external form, size, battery capacity) of battery packs.

Further, the battery pack is constructed such that it has a substantially triangular cross section or such that it takes a position in which cross section thereof become substantially triangular in form, with the result that a space formed in relation to the computer can be used for the disposition of the rows of batteries. Therefore, a battery pack, which can supply a large amount of power to the computer main body, can be connected to the computer main body without particularly increasing the size of the entire computer.

BRIEF DESCRIPTION OF THE DRAWINGS

The foregoing and other objects and features of the invention will become apparent from the following description of preferred embodiments of the invention with respect to the accompanying drawings, in which:

FIG. 1 is a perspective view of a portable computer wherein a first type of battery pack is mounted on the computer main body;

FIG. 2 is a perspective view of the computer in FIG. 1 as seen from the bottom surface;

FIG. 5 is a perspective view of a second type of battery pack mounted on a computer main body;

FIG. 6 is a drawing to show the state when the battery pack in FIG. 5 is mounted on the computer main body in a first position;

FIG. 7 is a drawing to show the state when that is in a second position;

FIG. 8A is a perspective view of a third type of battery pack mounted on the computer main body;

FIG. 8B is a drawing to show the state when the battery pack in FIG. 8A is mounted on the computer main body;

FIG. 11 is a drawing to show the supplementary battery pack for increasing capacity connected to the main battery pack mounted rotatably on the computer main body, and that main battery pack and supplementary battery pack in the first position in relation to the computer main body;

FIG. 12 is a drawing to show the main battery pack and supplementary battery pack in FIG. 11 in the second position in relation to the computer main body;

FIG. 14 is a drawing to show the state when the supplementary battery pack in FIG. 13 is connected rotatably to the main battery pack in FIG. 13 by the hinge structure and that supplementary battery pack is in the first position in relation to the main battery pack;

FIG. 15 is a drawing to show the state when the supplementary battery pack in FIG. 14 is in the second position in relation to the main battery pack;

FIG. 16A is a perspective view of the spring-loaded rod constituting the hinge structure in FIG. 14;

FIG. 16B is a drawing to explain the structure of the hinge structure in FIG. 14 for mounting the main battery pack and supplementary battery pack;

DETAILED DESCRIPTION OF THE PREFERRED EMBODIMENTS

Figure 3:
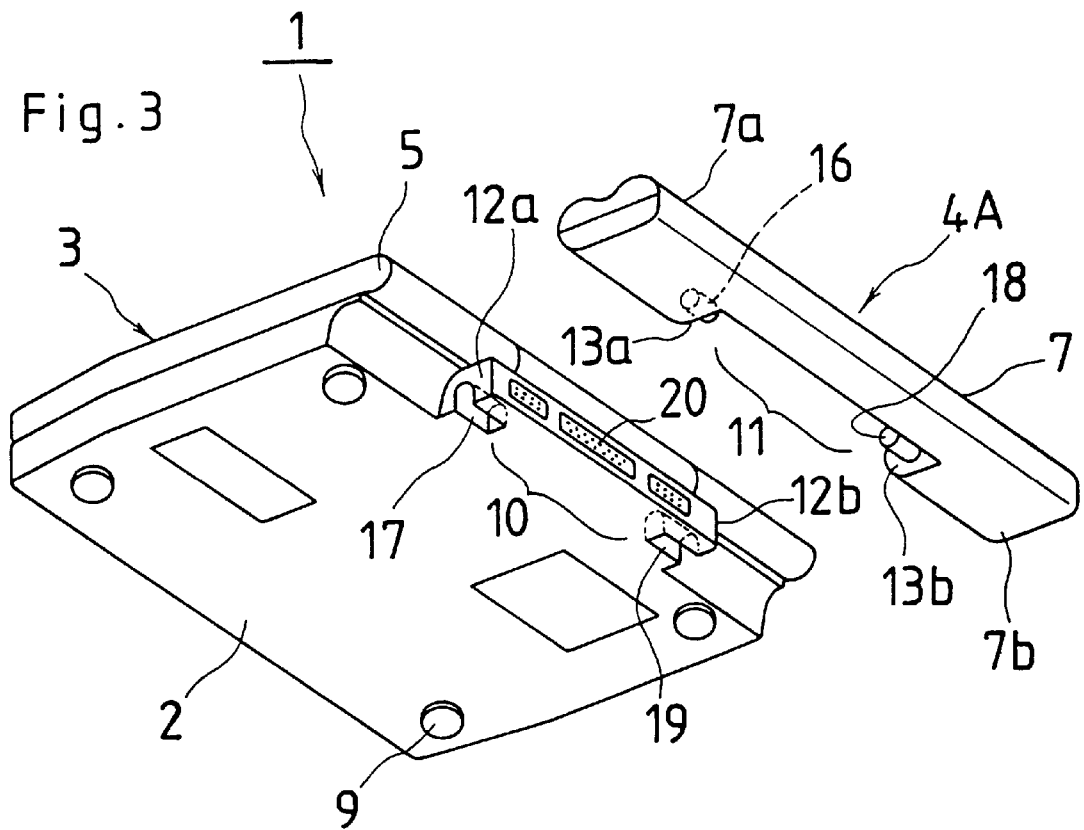
FIG. 3 is a drawing to explain the mounting structure of the main body and battery pack in the computer in FIG. 1.

This is an explanation of the constitution for selective and removable mounting of various battery packs, differing in external form, size, or battery capacity, on the main body of one portable computer.

The constitution for mounting a first type of battery pack on a computer main body is explained using FIGS. 1–4.

A portable computer 1 is constituted of a main body 2 housing a circuit board, constituting the computer system, and other functional elements within a main case 6; a display portion 3 which is openable and closable in relation to the main body 2 by means of a hinge portion 5; and a battery pack 4A which is installed removably on the rear portion of the main body 2. In FIG. 1, the usage state, wherein the display portion 3 is opened, is shown with a dashed line.

Figure 4:
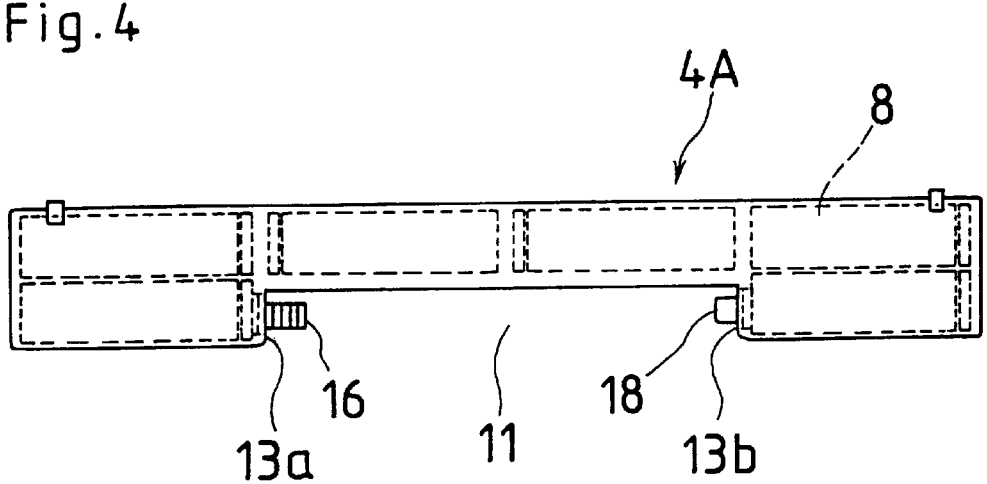
FIG. 4 is a drawing to explain the form of the battery pack in the computer in FIG. 1.

The first type of battery pack 4A can rotate around the pack axis of rotation X1 through a angle of over 90° between the horizontal position (solid line position in FIG. 1) and perpendicular position (dashed line position in FIG. 1). As shown in FIG. 3, the structure of the battery pack 4A has an upper case 7a of synthetic resin and lower case 7b of synthetic resin connected to form a case 7; therein are contained lithium batteries 8 of a size corresponding to an AA cell, arranged as shown in FIG. 4, wherein a total of six batteries are arranged with two batteries in the first row and four in the second row.

The six lithium batteries contained in the battery pack 4A are connected in three parallel groups of two serially connected bodies, to form a power source with an output voltage of 8V and capacity of 4050 mAh. The battery pack 4A is the same length as the width of the back edge of the computer main body 2 and is placed along the back edge of the main body 2. Also, the height (thickness) is about the same or slightly thicker than the main body 2.

When the battery pack 4A is in the horizontal position as in FIG. 2, the bottom surface thereof forms a single plane with the bottom surface of the main body 2. Moreover, rubber feet 9 are installed on the bottom surface of the main body. Meanwhile, when the battery pack 4A is in the perpendicular position as shown with the dashed line in FIG. 1, the back surface of the battery pack 4A protrudes below the bottom surface of the main body 2. For that reason, the main body 2 is inclined 7–9° toward the user when the portable computer 1 is placed on a desk when in this state; thereby the upper surface of the main case 6 is placed in a position which is easy for the user to see. The battery pack 4A may be in either the horizontal position or in the perpendicular position when the computer 1 is used.

The computer main body 2 is provided with a protruding portion 10, protruding to the rear from the central portion of the back edge, as shown in FIG. 3. Meanwhile, the battery pack 4A has a recessed portion 11, with a width corresponding to the width of the protruding portion 10 on the main body 2, on the side toward the back edge of the main body 2, specifically the front side, as shown in FIGS. 3 and 4.

When the recessed portion 11 of the battery pack 4A is engaged with the protruding portion 10 of the main body 2, the right end surface 12a of the protruding portion 10 of the main body 2 and the right end surface 13a of the recessed portion 11 of the battery pack 4A are connected with the right hinge structure 14. Also, the left end surface 12b of the protruding portion 10 of the main body 2 and the left end surface 13b of the recessed portion 11 of the battery pack 4A are connected with the left hinge structure 15. The axes of these right and left hinge structures 14 and 15 agree with the pack axis of rotation X1.

As shown in FIG. 3, the right hinge structure 14 comprises a rotating electrode 16 mounted on the right end surface 13a of the recessed portion 11 of the battery pack 4A and a connector 17 installed on the right end surface 12a of the protruding portion 10 of the main body 2. The connector 16 is arranged such that the axis thereof agrees with the pack axis of rotation X1. The connector 17 rotatably supports the rotating electrode 16 and the connector 17 can be removed from the rotating electrode 16.

The left hinge structured 15 comprises a protruding axis 18 installed on the left end surface 13b of the recessed portion 11 of the battery pack 4A and a bearing 19 installed on the left end surface 12b of the protruding portion 10 of the main body 2. The center of the protruding axis 18 agrees with the pack axis of rotation X1. The bearing 19 rotatably supports the protruding axis 18 and the protruding axis 18 can be removed from the bearing 19.

The rotating electrode 16 of the battery pack 4A is provided with an output terminal on the battery side. Also, the connector 17 of the main body 2 is provided with an input terminal connected to the computer system.

A jack 20 is installed on the back surface (surface opposite the recessed portion 11 of the battery pack 4A) of the protruding portion 10 of the main body 2; the jack 20 is used for connecting the computer system in the main body 2 with external devices (not pictured).

To install the battery pack 4A on the computer main body 2, the battery pack 4A is positioned so that its recessed portion 11 is opposite to the protruding portion 10 of the main body 2. Then, while remaining in that position, the battery pack 4A is brought close to the main body 2 and pressed to the main body 2. At which time, the rotating electrode 16 and the protruding axis 18, installed on the end surfaces 13a, 13b of the recessed portion of the battery pack 4A, respectively engage with the connector 17 and the bearing 19, installed on the side ends of the protruding portion 10 of the main body 2. In this state, power from the batteries in the battery pack 4A passes through the rotating electrode 16 and the rotating connector 17 and is supplied to the computer system inside the main body 2. Also, the battery pack 4A in this state can be rotated around the pack axis of rotation X1. Even if it is rotated, the engagement of the rotating electrode 16 and rotating connector 17 is maintained; therefore the supply of power to the main body 2 from the batteries in the battery pack 4A is not interrupted.

The battery pack 4A installed on the main body 2 is removed as follows. The battery pack 4A is raised upwards (in the direction perpendicular to the bottom surface of the main body 2) in relation to the main body 2 and the engagements of the connector 17 with the rotating electrode 16 and the bearing 19 with the rotating electrode 18 are released respectively. The battery pack 4A is removed from the main body 2.

It is inconvenient if the battery pack 4A is removed from the main body 2 just by lifting the battery pack 4A in relation to the main body 2, as discussed above. In this embodiment as shown in FIG. 2, opening and closing covers 21a, 21b are installed on the recessed engagement portions constituting the connector 17 and bearing 19 of the main body 2. The opening and closing covers 21a, 21b comprise long, flat panels of synthetic resin and are inserted movably in a sideways direction in grooves formed along the edges of the recessed engagement portions constituting the connector 17 and bearing 19.

When the recessed engagement portions 21a, 21b are moved in the direction for closing the recessed engagement portions, the supporting surfaces of the opening and closing covers 21a, 21b contact and support the rotating electrode 16 and protruding axis 18 of the battery pack 4A engaged with the connector 17 and bearing 19 of the main body 2. Consequently, the weight of the battery pack 4A is supported by the main case 6; the connections of the right and left hinge structures 14, 15, removably connecting the main body 2 and battery pack 4A, are stabilized; and the durability of the hinge structures is improved. The battery pack 4A is removed from the main body 2 if the battery pack 4A is lifted in relation to the main body 2, when the opening and closing covers 21a, 21b are moved in the direction for opening the recessed engagement portions.

As shown in FIGS. 3 and 4, the rotating electrode 16 and protruding axis 18 are positioned at a location more toward the main body 2, rather than the center (boundary of first and second rows of batteries) of the battery pack 4A. Furthermore, the connector 17 and bearing 19, which receive the rotating electrode 16 and the protruding axis 18, are installed at a location near the bottom surface and at the side ends of the protruding portion 10 of the main body 2. For this reason, the pack axis of rotation X1 is established as far as possible to the rear of and below the side end surfaces 12a, 12b of the protruding portion 10 of the main body 2.

Consequently, when the battery pack 4A is in the horizontal position (FIG. 2), the jack 20, positioned on the back surface of the protruding portion 10 of the main body 2, is covered with the battery pack 4A. Meanwhile, when the battery pack 4A rotates around the pack axis of rotation X1 and is put in the perpendicular position, the recessed portion 11 of the battery pack 4A draws far away from the back surface of the protruding portion 10 of the main body 2 and therefore the jack 20 is not covered with the battery pack 4A. In this state, the jack 20 can be connected to connectors from other devices.

In the present invention, it is also possible to selectively mount various battery packs of different types, as well as the aforementioned first type of battery pack 4A, on the computer main body 2. Below are explained the various forms of battery packs which can be selectively mounted on the same computer main body 2, instead of the first type of battery pack 4A.

A second type of battery pack 4B is explained using FIGS. 5 through 7.

In this battery pack 4B, four lithium batteries 8' of a D cell one size are housed in one row in a synthetic resin pack case of an upper case and lower case joined together. Furthermore, mounting portions 22a and 22b protrude on the right and left, with the center eliminated, in front of the portion housing the one row of batteries 8'. This is to form a recessed portion 11, which is provided the same height, width, and depth as the recessed portion 11 of the first type of battery pack 4A, between mounting portion 22a and mounting portion 22b.

In the same way as for the first type of battery pack 4A, a rotating electrode 16 is mounted in the right end surface 13a thereof and a protruding axis 18 is mounted in the left end surface 13b thereof in the recessed portion 11 of the battery pack 4B. As above, the form of this recessed portion 11 and the structure of the rotating electrode 16 and the protruding axis 18 mounted on the right and left end surfaces 13a, 13b of the recessed portion 11 are the same as those in the first type of battery pack 4A; therefore, the battery pack 4B can be installed on the computer main body 2 shown in FIGS. 1–3.

In other words, when the battery pack 4B is brought near the main body 2 and pressed on the main body 2, the rotating electrode 16 and protruding axis 18 of the battery pack 4B engage with the connector 17 and the bearing 19 of the main body 2.

Furthermore, the battery pack 4B is provided with a flat bottom surface. As shown in FIG. 6, when the battery pack 4B is installed on the main body 2 and put in the horizontal position, that bottom surface forms a single surface with the bottom surface of the main body 2.

The four batteries 8'housed in the battery pack 4B are connected in two parallel groups of two serially connected bodies, to form a power source with an output voltage of 8V and capacity of 5500 mAh (in the case of the first type of battery pack 4A, as above, the output voltage is 8V and capacity is 4050 mAh). Consequently, this battery pack 4B has a greater capacity than the first type of battery pack 4A;

therefore, the computer can be used for a longer period of time. The width of the battery pack 4B is the same as the width of the main body 2, like in the case of the first type of battery pack 4A. The height of the front portion (portion on both sides of the recessed portion 11) of the battery pack 4B is the same as the thickness of the main body 2, as shown in FIG. 6. Also, the height of the rear portion (portion housing one row of four batteries) is somewhat greater than the thickness of the whole computer when the display portion 3 is closed.

When installed on the computer main body 2, this battery pack 4B can rotate in relation to the main body 2 around the pack axis of rotation X1 in the same way as when the first type of battery pack 4A is installed. For this reason, the battery pack may be placed in the horizontal position (FIG. 6), where the bottom surface thereof forms one surface with the bottom surface of the main body 2; the perpendicular position (FIG. 7) where it holds up the rear of the main body 2; and arbitrary inclined positions therebetween.

Next, a third type of battery pack 4C is explained using FIGS. 8A and 8B.

In the third type of battery pack 4C, a total of ten batteries, of the same size as those housed in the first type of battery pack 4A, are contained in three rows: two (one on either side of the recessed portion 11) are placed in a first row, four in a second row, and another four in a third row.

Looking at the portion of this battery pack 4C housing the first and second rows of batteries, this battery pack 4C has essentially the same structure as the first type of battery pack 4A. The rotating electrode 16 is mounted in the right end surface 13a and the protruding axis 18 is mounted in the left end surface 13b in the recessed portion 11 of the battery pack 4C, the same as in the case of the first type of battery pack 4A. Specifically, this battery pack 4C corresponds to the first type of battery pack 4A with the addition of another battery housing portion for a row (third row) of batteries on the rear thereof.

The upper section of the battery housing portion for the third row in the battery pack 4C can be opened and closed with the cover 23; therefore, this third row of batteries can be freely replaced or removed. Consequently, a user can choose between use in the state where additional batteries are not contained or use as a large capacity battery pack with many batteries.

The flat bottom surface of this battery pack 4C, formed by the portion for housing the first and second rows of batteries, extends to the portion for housing the third row of batteries. Consequently, when the battery pack 4C is installed on the main body 2, it may be in a horizontal position (FIG. 8B), wherein the bottom surface thereof forms one surface with the bottom surface of the main body 2; a perpendicular position (not pictured), wherein the bottom surface thereof holds up the rear of the main body 2; and arbitrary inclined positions therebetween.

The battery pack 4C comprises a synthetic resin case formed of upper and lower halves.

The ten batteries 8 (AA cell size lithium batteries) housed in the battery pack 4C are connected in 5 parallel groups of two serially connected bodies, to form a power source with an output voltage of 8V and capacity of 6750 mAh. When this third type of battery pack 4C is used instead of the first type of battery pack 4A, the time the portable computer can be used can be extended 5/3 times.

Also, in this battery pack 4C, the portions housing the first, second, and third rows of batteries are of the same height; in other words, this battery pack 4C has the same height as the first type of battery pack 4A; therefore, the thickness of the portable computer in the state with the battery pack 4C mounted does not become thicker in part.

Figure 9:
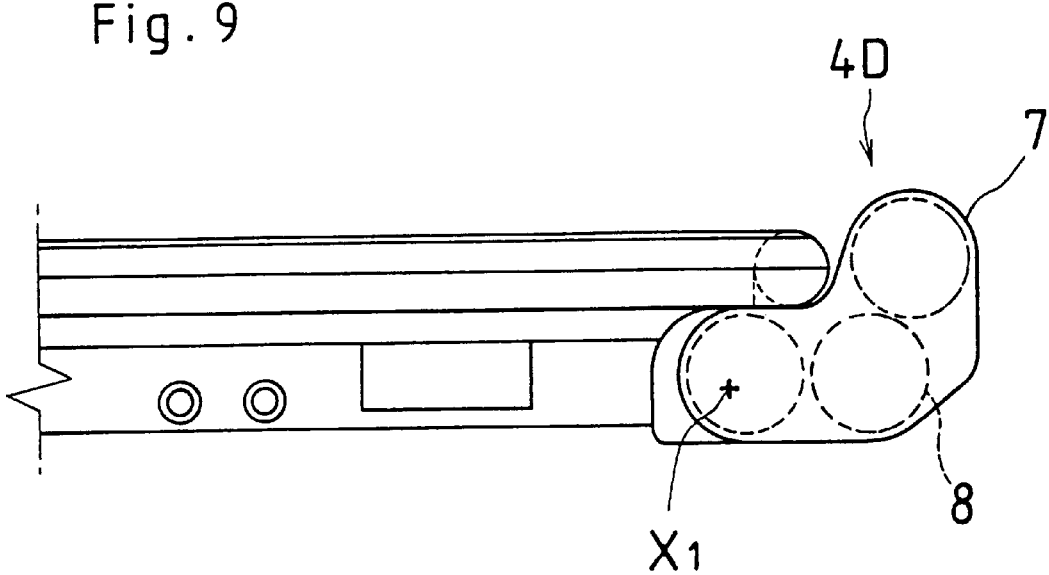
FIG. 9 is a drawing to explain the state when the fourth type of battery pack is mounted on the computer main body in a first position.
Figure 10:
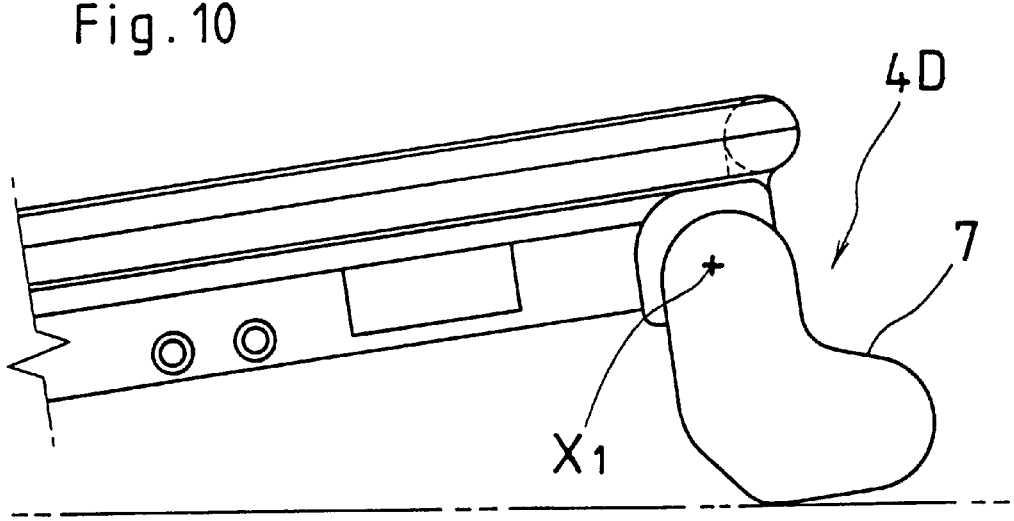
FIG. 10 is a drawing to explain the state when the battery pack in FIG. 9 is in a second position.

Next, a fourth type of battery pack 4D is explained using FIGS. 9 and 10.

In the same way as in the third type of battery pack 4C, this battery pack 4D houses three rows of ten batteries 8 of the same size as those housed in the first type of battery pack 4A, with two in the first row, four in the second row, and four in the third row. In the case of the third type of battery pack 4C, the central axes of each row of batteries are placed in the same plane (FIG. 8B); in the case of this battery pack 4D, the central axes of each row of batteries are not placed on the same plane.

Looking at the portion of this battery pack 4D housing the first row of batteries, this portion has essentially the same structure as that portion of the first type of battery pack 4A (in other words, that of the third type of battery pack 4C). Although not shown in FIGS. 9 and 10, the recessed portion is formed in the battery pack 4D; the rotating electrode and the protruding axis, to engage with the connector 17 and protruding axis 18 of the main body, are mounted in the left end surface and right end surface of that recessed portion.

The flat bottom surface of the battery pack 4D, to form a single plane with the bottom surface of the main body 2 when installed on the computer main body 2, only extends from the portion housing the first row (row closest to the main body 2) of batteries to partway along the portion housing the second row of batteries adjacent thereto. From that point, the flat bottom surface rises upwards from the portion housing the second row of batteries to the portion housing the third row of batteries there behind, as shown in FIG. 9.

Consequently, when the battery pack 4D is installed on the main body 2 and the bottom surface forms a single plane with the bottom surface of the main body 2, the portion of the battery pack 4D at the highest position is the upper surface of the portion housing the third row of batteries. However, the height thereof is higher, albeit slightly, than the upper surface of the display in the closed state as shown in FIG. 9.

The third alternative battery pack 4D is the same as the third type of battery pack 4C in regards to being able to house ten batteries in three rows. An advantage is that the length from front to back is shorter, although the thickness (height when placed on a desk) is thicker than the battery pack 4C.

As discussed above, with the embodiment of the present invention, users who want a small-sized battery pack even if power cell capacity is low may mount the first type of battery pack 4A on the computer main body 2.

Also, users who want a fairly high capacity of the power cells housed, even if the size of the battery pack becomes rather large, may mount the second type of battery pack 4B on the computer main body 2.

Furthermore, users who want to increase power cell capacity without increasing the height, though increasing the size of the battery pack, may mount the third type of battery pack 4C on the computer main body 2.

Furthermore, users who want to increase power cell capacity by increasing both battery pack height and depth may mount the fourth alternative battery pack 4D on the computer main body 2.

Thereby, with the embodiment, all of various types of battery packs 4A, 4B, 4C, and 4D are provided with a recessed portion 11, corresponding to a protruding portion of the computer main body 2, in the center of the front portion. The rotating electrode 16 and protruding axis 18, disposed so as to engage with the connector 17 and bearing 19 installed on the protruding portion of the computer main body 2, are mounted on the side end surfaces of that recessed portion. For these reasons, one of various types of battery packs can be selected and mounted on the computer main body 2, depending on the situation.

Moreover, in the explanation above, the protruding portion 10 is formed on the main body 2 and the recessed portion 11 on the battery pack 4, the recessed portion 11 of the battery pack 4 engages with the protruding portion 10 of the main body 2, and the battery pack 4 is installed on the main body 2. However, instead of this structure, it is also possible for the recessed portion to be formed on the main body 2 and the protruding portion on the battery pack 4 and the protruding portion of the battery pack 4 to engage with the recessed portion of the main body 2, so that the battery pack 4 is installed on the main body 2. In this case, the rotating electrode 16 and the protruding axis 18 are installed on the recessed portion and the connector 17 and bearing 19 are installed on the protruding portion.

Furthermore, in the present invention, one type of battery pack which can be mounted selectively on the main body of a portable computer may also be a battery pack wherein a supplementary battery pack, for increasing the capacity and which houses a plurality of batteries therein, is mounted on one battery pack. A number of examples thereof are explained below.

Figure 13:
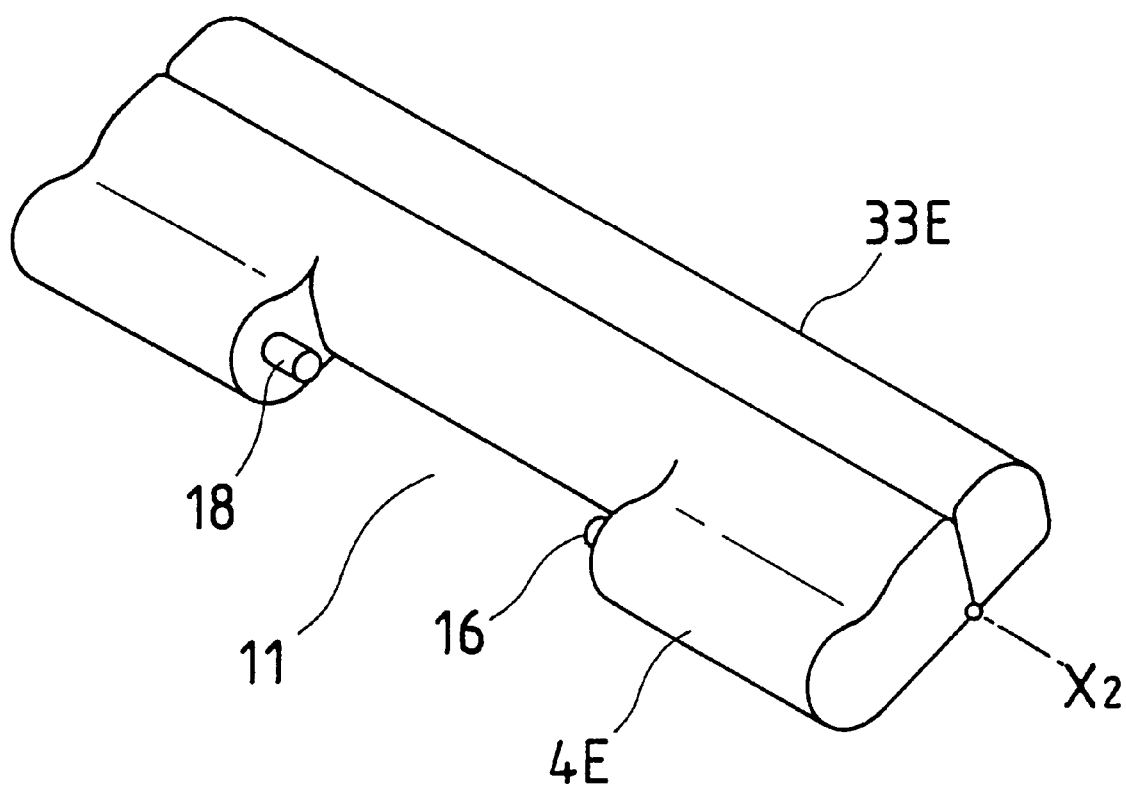
FIG. 13 is a perspective view to show the state when the supplementary battery pack is connected rotatably around the axis of rotation X2 in relation to the main battery pack.

FIGS. 11 through 13 show the state wherein one supplementary battery pack 33E is mounted on one battery pack (below, this battery pack is called the "main pack") 4E directly mounted on the main body 2 of the portable computer 1. This supplementary battery pack 33E is able to rotate in relation to the main pack 4E around an axis of rotation X2, established at the corner where the bottom surface joins the rear surface of the main pack 4E. Moreover, the constitution (hinge mechanism), for removably mounting this supplementary battery pack 33E on the main pack 4E and making it rotatable around the axis of rotation X2, is explained below.

As understood from the perspective view in FIG. 13, this main pack 4E has essentially the same structure as the first type of battery pack 4A explained with reference to FIGS. 1–4. Also, the computer main body 2 which accepts this main pack 4E is the same as that which accepts the battery pack 4A. In other words, the mounting structure, with which the computer main body 2 and main pack are provided for mounting the main pack 4E on the computer main body 2, is essentially the same as the mounting structure, with which the computer main body 2 and each battery pack are provided for mounting the various battery packs 4A, 4B, 4C . . . on the computer main body 2.

Like the first type of battery pack 4A, the front portion of the main pack 4E is mounted rotatably on the back edge of the computer main body 2. The main pack 4E is rotatable from the horizontal position (FIG. 11), where the bottom surface of the main pack 4E and the bottom surface of the main body 2 form a single surface, to the position (FIG. 2) slightly over 90° downward. Furthermore, a supplementary pack 33E is attached to the main pack 4E so that the bottom surface of the former and bottom surface of the latter are positioned on a single plane. Also, this supplementary pack 33E can be rotated in relation to the main pack 4E (in the direction towards the bottom surface of the main body 2) around an axis of rotation X2 from that position.

This supplementary pack 33E comprises a synthetic resin case formed of upper and lower halves. It can contain four batteries of the same size and capacity as the batteries (lithium batteries) 8 contained in the main pack 4E. These four batteries 8 are connected in two parallel groups of two serially connected bodies. The batteries so connected are connected to the batteries 8 in the main pack 4E (connected in three parallel groups of two serially connected bodies) by means of a flexible cable (not pictured). The height of the supplementary pack 33E is the same as that of the main pack 4E.

The supplementary pack 33E can be mounted on and removed from the main pack 4E; therefore, it is possible to install only the main pack 4E, or to install a combination of the main pack 4E and the supplementary pack 33E, on the computer main body 2.

For creating the state wherein a combination of the main pack 4E and the supplementary pack 33E are installed on the main body 2, the main pack 4E may be installed on the main body 2, then the supplementary pack 33E may be mounted on the main pack 4E. On the other hand, the main pack 4E may be combined with the supplementary pack 33E, and then the main pack of the combined body may be installed on the main body 2.

The installation of only the main pack 4E on the computer main body 2 is equivalent to the connection of three parallel groups of two serially connected bodies; therefore, this becomes a power source with an output voltage of 8V and capacity of 4050 mAh, as when the first type of battery pack 4A (FIGS. 1–4) is installed on the computer main body 2.

On the other hand, the installation of the combined body of the main pack 4E and the supplementary pack 33E on the computer main body 2 is equivalent to the connection of five parallel groups (three groups plus two groups) of two serially connected bodies; therefore, this becomes a power source with an output voltage of 8V and total capacity of 6750 mAh, like the third type of battery pack 4C (FIGS. 8A, 8B). In this way, the use of the supplementary pack 33E can lengthen the usage time by 5/3 times.

If the type (size) of batteries to be housed in the supplementary pack 33E is the same as that to be housed in the main pack 4E, when the main pack 4E and the supplementary pack 33E are connected so that their respective bottom surfaces form a single plane, the upper surfaces of those packs 4E and 33E also become aligned, as shown in FIG. 11. Therefore, even if the supplementary pack 33E is further mounted on the computer 1 wherein the main pack 4E is installed, the height of the entirety is not increased.

Furthermore, when the main pack 4E is rotated in relation to the main body 2 and placed in the perpendicular position and then the supplementary pack 33E is rotated in relation to the main pack 4E toward the bottom surface of the computer main body 2, the supplementary pack 33E is contained within a space having a triangular cross section formed between the bottom surface of the main body 2 and the table surface tb on which the main body 2 is placed, as shown in FIG. 12. The situation of usage is good because the upper surface of the computer main body 2 in this state is in an inclined position facing the user and the supplementary pack 33E does not protrude to the rear.

Next, the structure for removably mounting the supplementary pack 33E on the main pack 4E and rotating the supplementary pack 33E in relation to the main pack 4E around the axis of rotation X2 is explained using FIGS. 14 through 16B.

As shown in FIG. 16B, a pair of recessed portions 41 are formed at the corner where the front surface and bottom surface of the main pack 4E meet; a pair of recessed portions 42 are formed at the corner where the rear surface and bottom surface of the supplementary pack 33E meet. Moreover, in FIG. 16B, the main pack 4E and supplementary pack 33E are placed in an inverted state. When the end surface of the supplementary pack 33E and the front surface of the main pack 4E are placed one on top of the other, and the bottom surface of the main pack 4E and the bottom surface of the supplementary pack 33E are positioned on the same plane, the recessed portions 41 are opposite to the recessed portions 42 and a space is formed therebetween. The hinges 44 are inserted in both of this pair of spaces.

Each hinge 44 is provided with two spring-loaded rods 45, shown in FIG. 16A, which are extendable in the direction of the axis of rotation X2. Meanwhile, a rod insertion through hole 46, to receive the rod 45, is formed on one end of each of the recessed portions 41 of the main pack 4E and the recessed portions 42 of the supplementary pack 33E.

When the supplementary pack 33E and main pack 4E are connected by means of the hinges 44, the main pack 4E and hinges 44 rotate around one rod 45 of the hinges 44 and the hinges 44 and supplementary pack 33E rotate round the other rod 45 of the hinges 44. As a result, the main pack 4E and supplementary pack 33E connected together by means of the hinges 44 can be changed from the position shown in FIG. 14 (the position corresponding to the position shown in FIG. 11) to the position shown in FIG. 15 (position shown in FIG. 12). In this case, the axis of rotation X2 passes through the centers (between rod 45 and rod 45) of the hinges 44.

To remove the supplementary pack 33E from the main pack 4E, the rod 45 may be pressed in opposition to the reaction force of the spring and the hinges may be removed. Because the hinges 44 are inserted in the recessed portions, the hinges 44 do not protrude from the plane, even when the bottom surface of the main pack 4E and the bottom surface of the supplementary pack 33E are in the same plane as shown in FIG. 14.

Next, a structure for removably mounting the supplementary pack on the main pack, which is different from that shown in FIGS. 14 through 16A, is explained using FIGS. 17 through 20.

Figure 18:
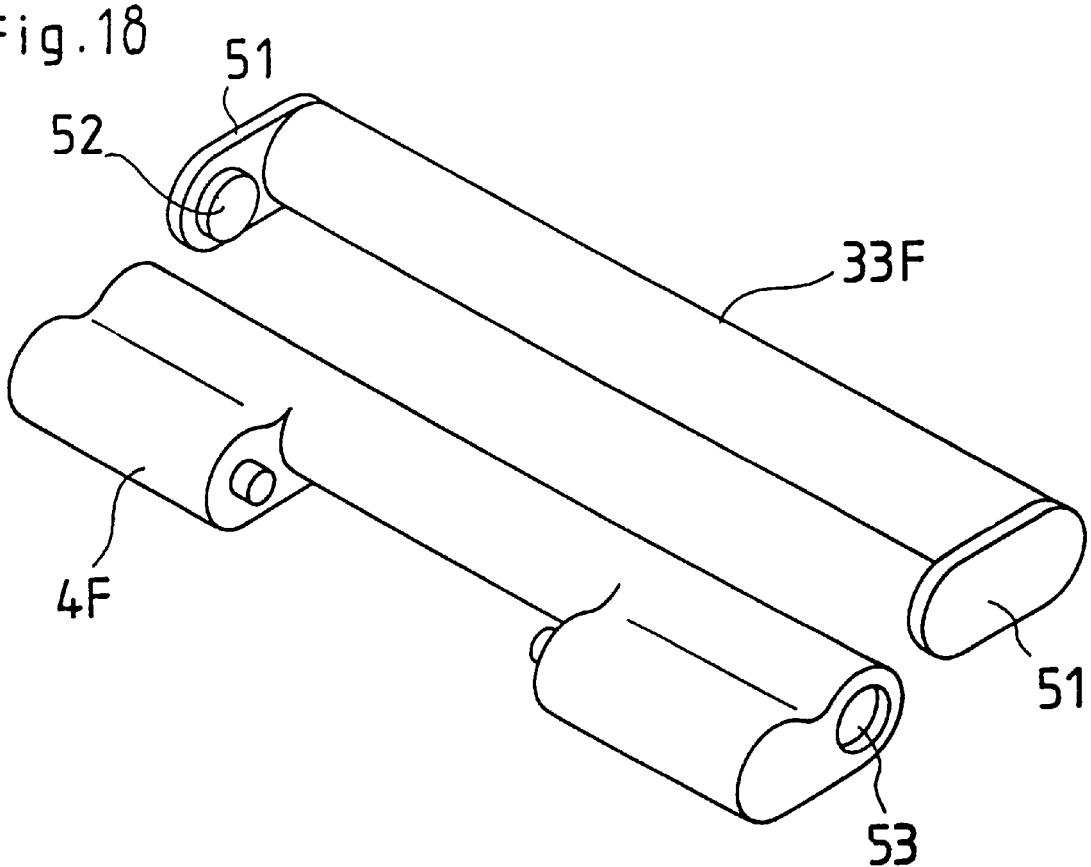
FIG. 18 is a perspective view showing the state directly before the supplementary battery pack in FIG. 17 is connected to the main battery pack in FIG. 17.
Figure 19:
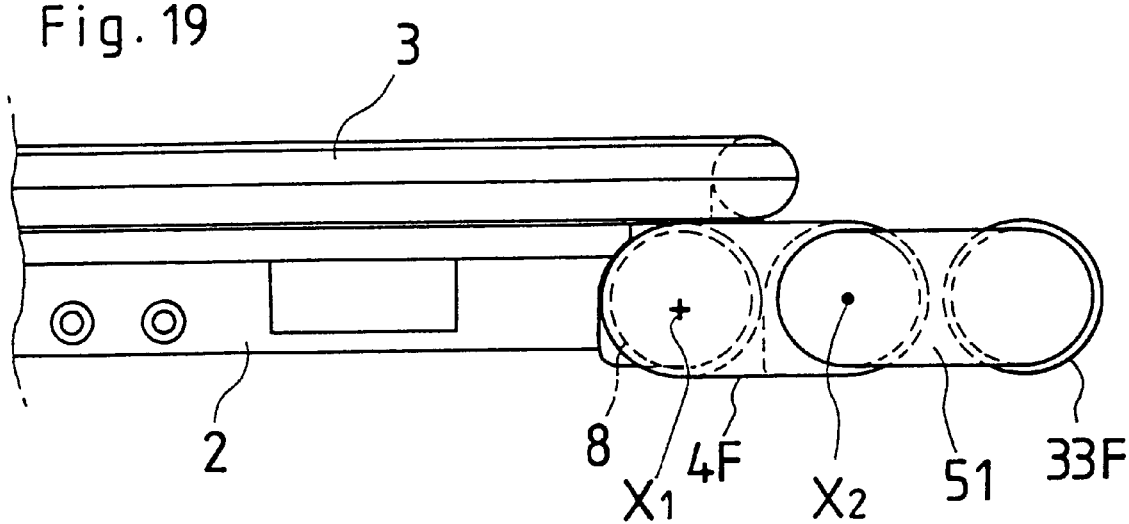
FIG. 19 is a drawing to show the state when the combination of the main battery pack and the supplementary battery pack in FIG. 17 is mounted on the computer main body and placed in the first position.

The supplementary pack 33F has a pair of arms 51 extending in a direction perpendicular to the axis from both ends thereof, as shown in FIG. 18. Protruding portions 52, protruding in the direction of the opposite arm 51, are provided on the inside surfaces of the end portions of each arm 51. The central axis of the protruding portion 52 of one arm 51 and the central axis of the protruding portion 52 of the other arm 51 are positioned on a single line which is parallel to the axis of the row of batteries contained in the supplementary pack 33F.

Meanwhile, bearing recessed portions 53 are formed on the rear portion of both sides of the main pack 4F. The central axis of the bearing recessed portion 53 on one side and that of the bearing recessed portion 53 on the other side match a single line which is parallel to the central axis of one row of batteries contained in the main pack 4F.

When the supplementary pack 33F is brought toward the main pack 4F so that both sides of the main pack 4F are held between both arms 51 of the supplementary pack 33F, the protruding portions 52 of the arms 51 engage with the bearing recessed portions 53 of the main pack 4F. Thereby the supplementary pack 33F is joined with the main pack 4F. Also, the connected supplementary pack 33F can rotate around the central axis of the bearing recessed portion 53 and the protruding portion 52. In other words, the central axis of the bearing recessed portion 53 and that of the protruding portion 52 coincides with the axis of rotation X2. If force is applied in the direction for separating the supplementary pack 33F from the main pack 4F, the protruding portion 52 of the arm 51 is removed from the bearing recessed portion 53 of the supplementary pack 33F.

In this example, the axis of rotation X2 is not located at the corner where the front surface and bottom surface of the main pack 4F meet (corner where the rear surface and bottom surface of the supplementary pack 33F meet), as shown in FIG. 11 or 14. However, when the protruding portions 52 of the arm 51 engage with the bearing recessed portions 53 of the main pack 4F, the main pack 4F and supplementary pack 33F which are joined may be in the state (FIG. 19) where the bottom surfaces of both form one plane or in the state (FIG. 20) where these main pack and supplementary pack are contained in a space formed between the surface of the table c whereon the main body 2 is placed and the bottom surface of the main body 2, like in the case as shown in FIGS. 14 and 15.

Figure 21:
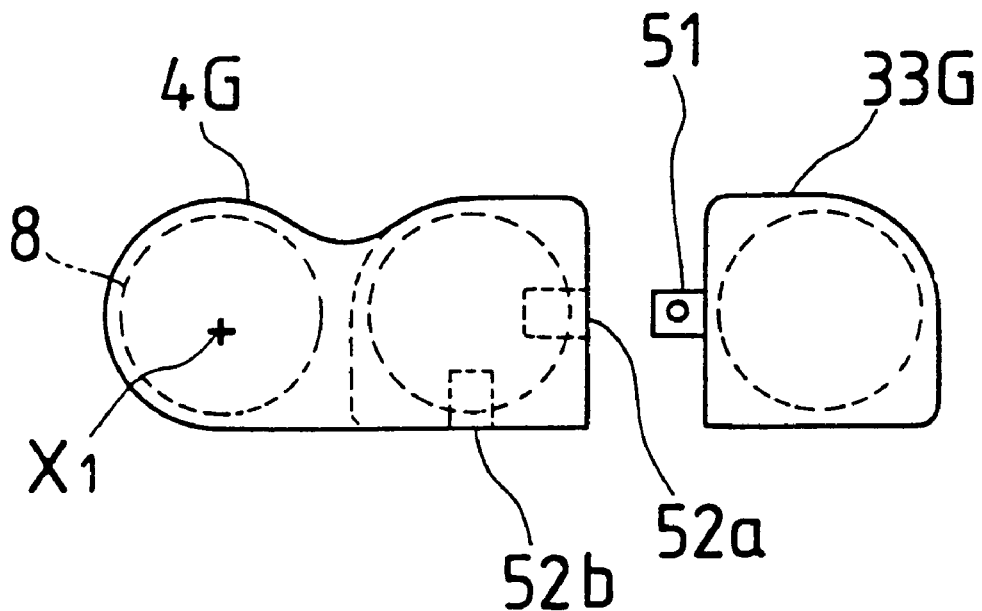
FIG. 21 is a drawing to show a mounting structure, of a form different from the mounting structure shown in FIGS. 14 and 17, installed between the main battery pack and supplementary battery pack; this is a drawing to show the state wherein the supplementary battery pack is to be connected so as to be in the first position in relation to the main battery pack.
Figure 22:
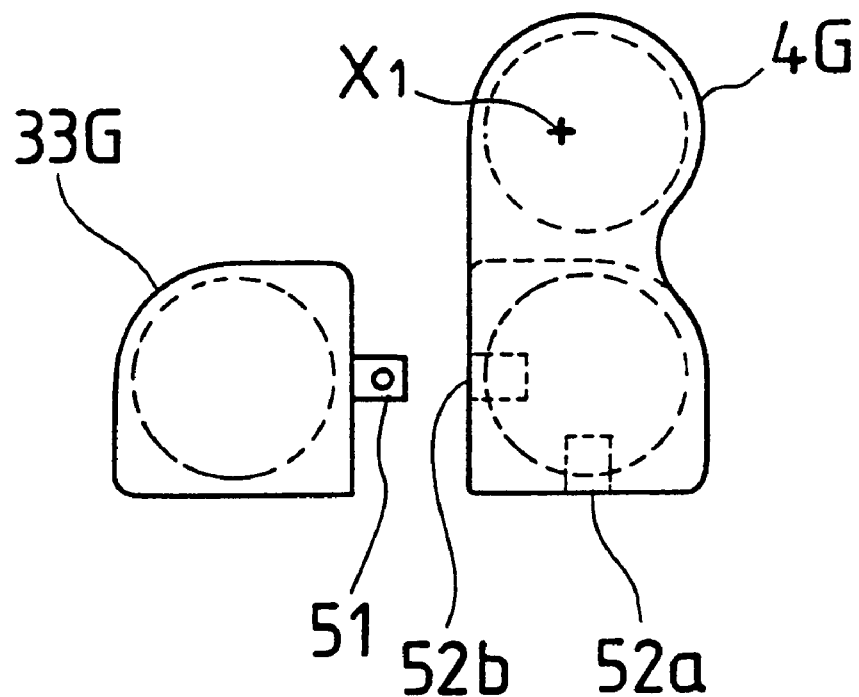
FIG. 22 is a drawing to show the state wherein the supplementary battery pack in FIG. 21 is to be connected so as to be in the second position in relation to the main battery pack.

Next, another example of the structure for removably mounting the supplementary pack on the main pack is explained using FIGS. 21 and 22.

The main pack 4G is provided with a pair of plug outlets 52$a$ on both the right and left sides of the back surface and a pair of plug outlets 52$b$ on both the right and left sides of the bottom surface. Meanwhile, the supplementary pack 33G is provided with a pair of plugs 51 on both the right and left sides of the front surface thereof.

The plug outlets 52$a$, 52$b$ on the main pack 4G are connected to the battery line within the main pack 4G. The plugs 51 of the supplementary pack 33G are connected to the battery line within the supplementary pack 33G. Consequently, when the plugs 51 of the supplementary pack 33G are plugged into either the plug outlets 52$a$ or 52$b$ of the main pack 4G, the supplementary pack 33G is both mechanically and electrically connected to the main pack 4G.

When the plugs 51 of the supplementary pack 33G are fit into the plug outlets 52$a$ established on the back surface of the main pack 4G, the bottom surface of the main pack 4G and the bottom surface of the supplementary pack 33G are placed on the same plane (for example, a table surface), as shown in FIG. 21. On the other hand, when the plugs 51 of the supplementary pack 33G are fit into the plug outlets 52$b$ established on the bottom surface of the main pack 4G, the supplementary pack 33G is placed in a position opposite to the bottom surface of the main pack 4G, as shown in FIG. 22. When the position of the main pack 4G shown in FIG. 22 is equivalent to the position of the main pack 4E shown in FIG. 12 (in other words, the state where the main pack 4G is perpendicular to the main body 2), the position of the supplementary pack 33G is also equivalent to the position of the supplementary pack 33E shown in FIG. 12.

All of the main packs 4E, 4F, 4G explained above contain two rows of batteries; there are two batteries in the first row and four batteries in the second row. Also, the supplementary packs 33E, 33F, 33G all contain four batteries in one row.

Figure 23:
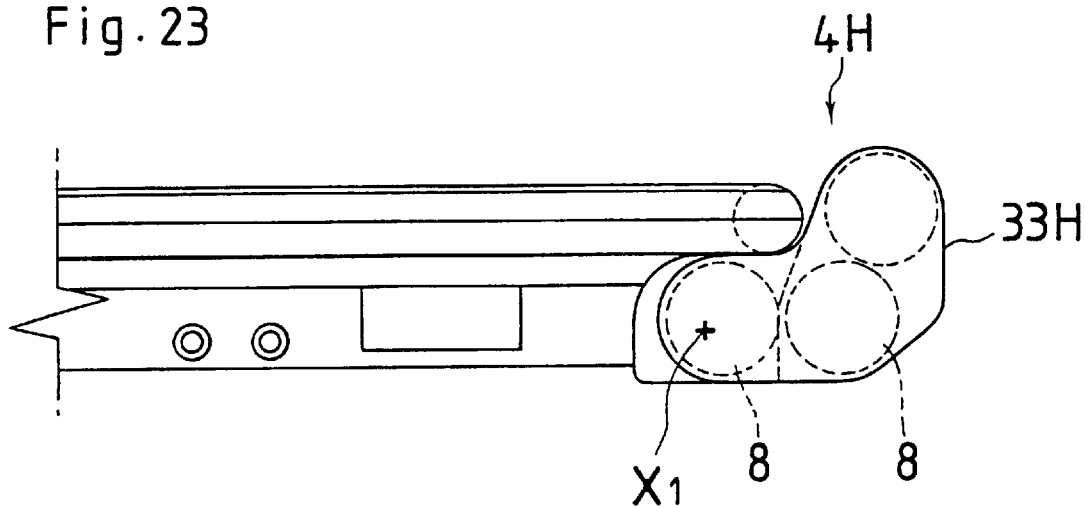
FIG. 23 is a drawing to show the state wherein the supplementary battery pack for increasing capacity is connected to the main battery pack mounted on the computer main body and the supplementary battery pack is in the first position in relation to the main battery pack.
Figure 24:
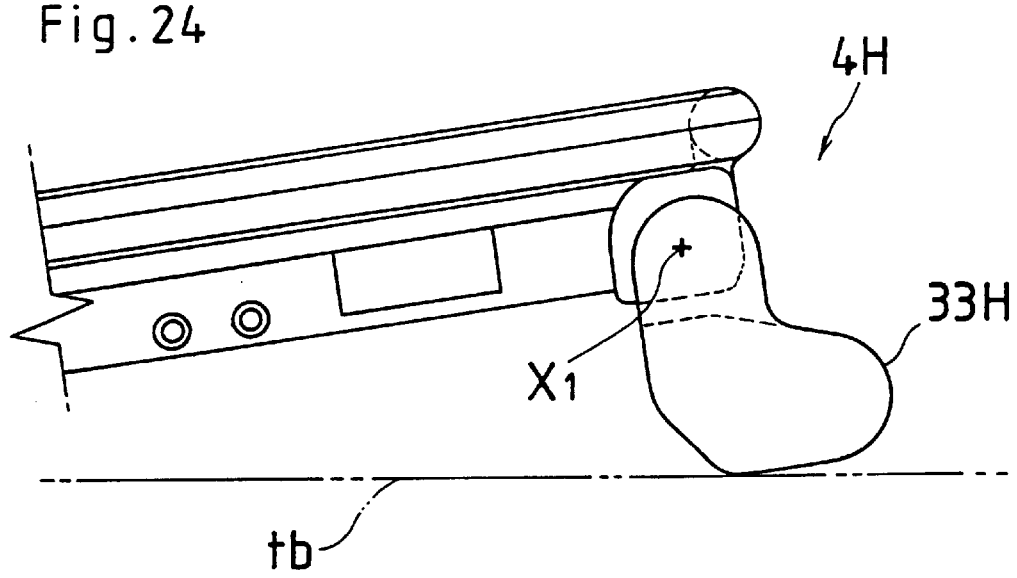
FIG. 24 is a drawing to show the state wherein the supplementary battery pack in FIG. 23 is in the second position in relation to the main battery pack in FIG. 23.

Below, examples wherein the main pack is of a small size for housing one row of two batteries and including the recessed portion 11 and wherein the corresponding supplementary pack is of a large size for holding eight batteries 8 in two rows are explained using FIGS. 23 and 24.

This main pack 4H corresponds to the form in FIG. 13 with the portion housing the second row of batteries removed from the main pack 4E housing two rows of batteries. This main pack 4H also is provided with the same type of structure (hinge structure, not pictured) for mounting on the computer main body 2 as in the main pack 4E in FIG. 13.

Figure 17:
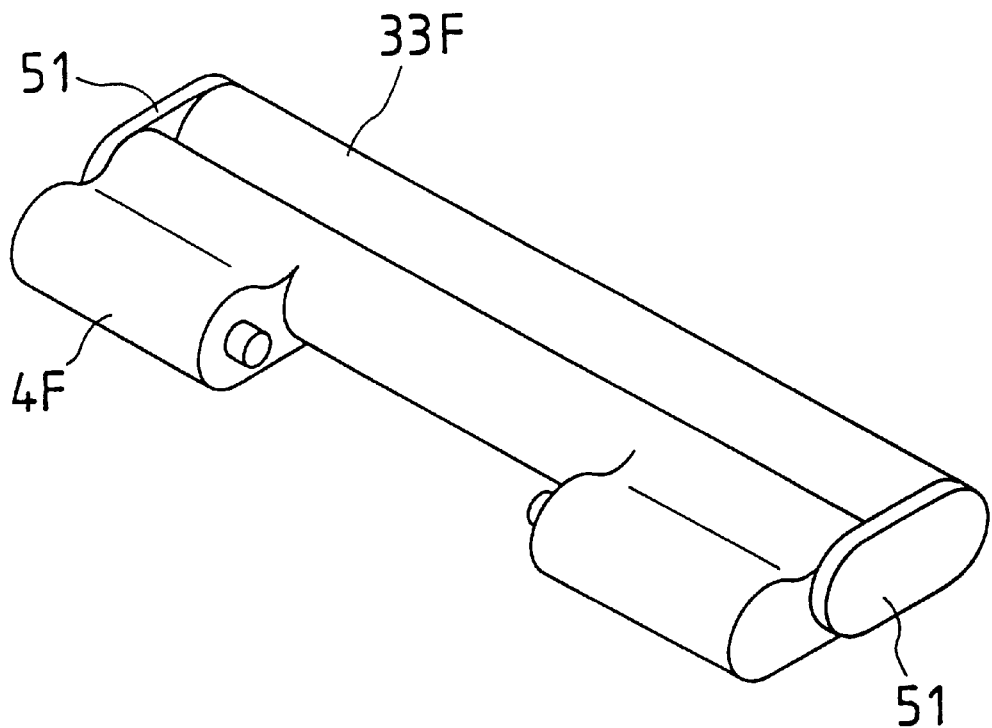
FIG. 17 is a perspective view to show the state when the main battery pack and supplementary battery pack are connected where the hinge structure in FIG. 14 has a different form of mounting structure.

Also, the type of structure shown in FIGS. 17 and 18 is employed for the structure for mounting the supplementary pack on the main pack. In other words, the supplementary pack 33H has a pair of arms (not pictured) protruding from both ends of the battery housing portion for the row closer to the main pack 4H and is provided with protruding portions on the inner surfaces of the end portion of each arm. Meanwhile, bearing recessed portions (not pictured), for receiving the protruding portions, are formed on both sides of the rear portion of the main pack 4H.

This main pack 4H has a sectional area sufficient for housing the batteries in one row; therefore, the main body 2 cannot be placed at an incline even if this is rotated in relation to the computer main body 2. For this reason, the supplementary pack 33H is rotated in relation to the main pack 4H to select the position wherein the main body 2 is not inclined, as shown in FIG. 23, or the position wherein the main body 2 is inclined, as shown in FIG. 24.

In this embodiment, the weight when the portable computer is carried about during normal use can be reduced because the main pack 4H is lightweight. Also, the supplementary pack 33H may be quickly added when longer use is desired.

Above, there is one type of main pack and one type of supplementary pack corresponding thereto: the supplementary pack connected with the main pack 4E being 33E, the supplementary pack connected with the main pack 4F being 33F, the supplementary pack connected with the main pack 4G being 33G, and the supplementary pack to be connected with the main pack 4H being 33H. However, the supplementary pack to be connected to the main pack 4E, for example, need not be limited to the item 33E shown in FIGS. 12 and 13 and various other types of supplementary packs (not pictured) may be added selectively.

Furthermore, the portable computer may be one in which a main battery is housed within the casing thereof and a plurality of types of supplementary packs may be selectively connected to the computer main body thereof by means of a mounting structure as explained above. In this way, a user can use the computer with only the battery contained within the main [unit] and also select and connect an arbitrary supplementary pack to that internal battery, and can extend usage time.

Moreover, for the plurality of battery packs to be connected to the computer main body 2, the front portions of the battery pack 4B shown in FIGS. 5 to 7 and the battery pack 4D shown in FIGS. 9 and 10 are the same thickness as the main body 2 as discussed above. The rear portions thereof are somewhat thicker than the computer when the display portion 3 is closed. In other words, the battery packs are thin in the front (axis of rotation side) and thick in the rear. For this reason, the cross sections, perpendicular to the axis of rotation, of these battery packs have a substantially triangular form.

For this reason, the thin portion, housing one row of batteries, of the front portions of the battery packs 4B and 4D goes into the gap formed between the back of the computer main body 2 and the bottom surface of the back end of the display portion 3. As a result, the position of the axis of rotation X1, of the battery packs 4B, 4D in relation to the computer main body 2, may be established at a certain distance to the front of the back end of the display portion 3 (in other words, the back end of the computer 1). Consequently, the depth of the entire computer 1 whereon the battery packs 4B and 4D are mounted is not increased. Also, the portion housing these two rows of batteries on the back portion of the battery packs 4B, 4D, wherein a portion where large batteries are housed or one row of batteries and another row of batteries are arranged at an upward slant, is arranged to be firmly attached to the rear surface of the computer main body 2. In the normal state of usage (See FIGS. 6 and 9), the upper surface of the portion does not protrude above the level of the upper surface of the closed display portion 3 and moreover, it does not obstruct the opening and closing of the display portion 3.

Figure 20:
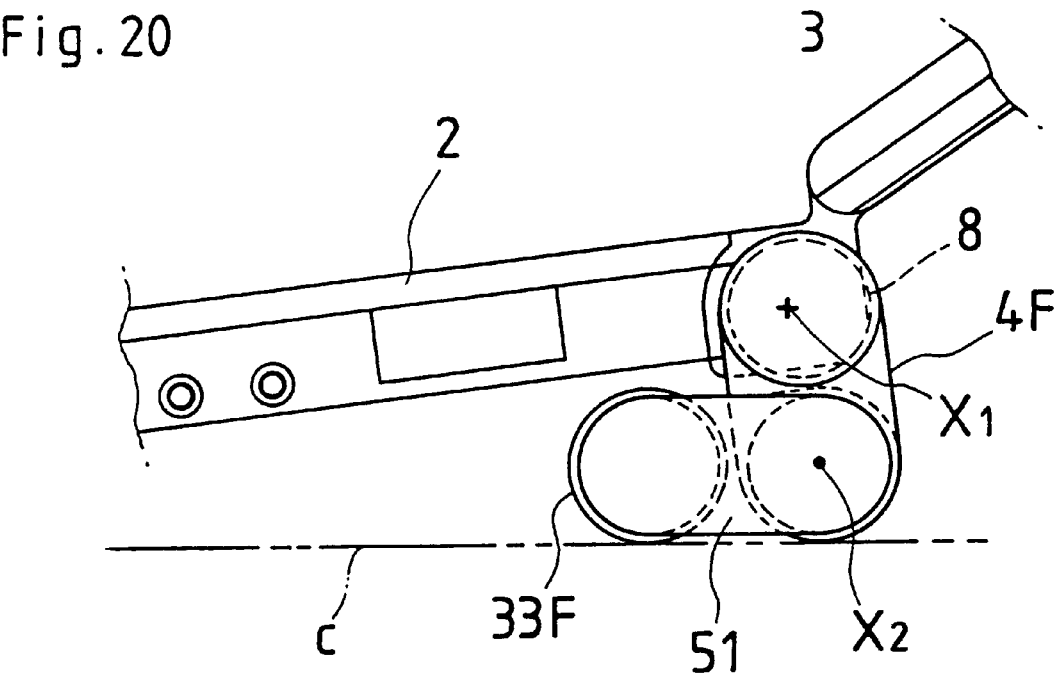
FIG. 20 is a drawing to show the state when the combination of the main battery pack and the supplementary battery pack in FIG. 17 is mounted on the computer main body and placed in the second position.

Furthermore, in the case of the battery pack wherein the supplementary packs 33E–33G are connected to the main packs 4E–4G, as shown in FIGS. 11 to 22, when the computer is placed at an incline on the surface of a desk the cross section perpendicular to the axis of rotation of the battery pack becomes substantially triangular in form as shown in FIGS. 12 and 20. Part of the supplementary pack is positioned below the back of the computer main body 2, the back of which is raised; therefore, the entire battery pack does not protrude to the rear beyond the back of the computer main body 2.

As explained above, the battery pack is constructed such that it has a substantially triangular cross section or such that it takes a position in which cross section thereof become substantially triangular in form, with the result that a space formed in relation to the computer can be used for the disposition of the rows of batteries. Therefore, a battery pack, which can supply a large amount of power to the computer main body, can be connected to the computer main body without particularly increasing the size of the entire computer.

What is claimed is:

1. A portable computer system comprising:
   a computer main body which is portable and is provided with a body side mounting portion; and
   a plurality of battery packs which are each provided with a pack side mounting portion having a structure which engages with the body side mounting portion of said computer main body; wherein
   at least two of said plurality of battery packs have different capacities or exterior shapes, and any one of said plurality of battery packs is removably mounted on said computer main body by the engagement of the pack side mounting portion with the body side mounting portion of said computer main body.

2. A portable computer system according to claim 1, wherein one of either said body side mounting portion or said pack side mounting portion comprises a rotating electrode and the other comprises a connector for engaging with this rotating electrode; and thereby, the mounted battery pack is made rotatable in relation to the computer main body around an axis of rotation coinciding with the axis of said rotating electrode.

3. A portable computer system according to claim 2, wherein a jack, for effecting transfer of signals with external devices, is mounted on the back end surface of said computer main body, and wherein the jack is covered by the front end surface of the recessed portion of the battery pack mounted on the computer main body and is exposed through the rotation of the battery pack.

4. A portable computer system according to claim 1, wherein, a protruding portion or recessed portion is formed on the back of said computer main body; and said body mounting portion is provided on said protruding portion or recessed portion;

on each of said plurality of battery packs, a recessed portion or protruding portion having a width and depth corresponding to said protruding portion or recessed portion is formed on the front of each; and said pack mounting portion is provided on the sides of that recessed portion or protruding protion.

5. A portable computer system according to claim 1, wherein said plurality of battery packs comprise a first battery pack housing a first number of batteries of a first size and a second battery pack housing a different number of batteries of the same size.

6. A portable computer system according to claim 1, wherein said plurality of battery packs comprise a first battery pack housing a first number of batteries of a first size and a second battery pack housing the same number of batteries of a different size.

7. A portable computer system according to claim 1, wherein said plurality of battery packs comprise a first battery pack housing one or more rows of batteries of a first size and a second battery pack housing a different number of rows of batteries of the same or a different size.

8. A portable computer system according to claim 1, wherein said plurality of battery packs comprise a first battery pack housing one or more rows of batteries of a first size and a second battery pack housing the same number of rows of batteries of a different size.

9. A portable computer system according to claim 1, wherein one of said plurality of battery packs comprises a battery pack housing two or more rows of batteries and wherein an exterior surface of the battery pack adjacent a first and a second row of batteries forms a first flat surface.

10. A portable computer system according to claim 9, wherein said battery pack houses three rows of batteries and wherein the third row of batteries are disposed adjacent the first flat surface.

11. A portable computer system according to claim 9, wherein said battery pack houses three rows of batteries and wherein an exterior surface of the battery pack adjacent the third row of batteries form a second flat surface at an angle from the first flat surface.

12. A portable computer system according to claim 9, wherein said battery pack is constituted so that the first flat surface forms a single plane with the bottom surface of the computer main body when said battery pack is mounted on the computer main body by means of said body side mounting portion and said pack side mounting portion.

13. A portable computer system according to claim 11, wherein the first flat surface forms a single plane with the bottom surface of the computer main body, the second flat surface is disposed above said first flat surface and an axis of the third row of batteries is disposed above axes of the first and second rows of batteries when said battery pack is mounted on the computer main body by means of said body side mounting portion and said pack side mounting portion.

14. A portable computer system according to claim 1, wherein said plurality of battery packs comprises a first battery pack provided with a pack side mounting portion for engagement with the body side mounting portion of the computer main body, the computer system further comprising a supplementary battery pack, wherein each of the first battery pack and the supplementary battery pack is provided with an auxiliary mounting mechanism for mounting the supplementary battery pack to the first battery pack.

15. A portable computer system according to claim 14, wherein said supplementary battery pack is mounted on said first battery pack in a manner such that it alternatively assumes a first posture with respect to said first battery pack and a second posture, different from the first posture, with respect to said first battery pack.

16. A portable computer system according to claim 15, wherein said first posture is substantially at an angle of 90° with respect to said second posture.

17. A portable computer system according to claim 15, wherein said supplementary battery pack and said first battery pack house batteries of the same size, and wherein when said supplementary battery pack is in the first posture, a height thereof is substantially equal to a height of the first battery pack.

18. A portable computer system according to claim 15, wherein said supplementary battery pack changes between said first posture and second posture by means of a hinge mechanism provided at the corner where the bottom surface and the front surface of said first battery pack meet each other.

19. A portable computer system according to claim 15, wherein:

the auxiliary engagement mechanism of said supplementary battery pack comprises a pair of engaging protruding portions provided on one side surface of the supplementary battery pack, and the auxiliary engagement mechanism of said first battery pack comprises engaging recessed portions provided on a first and a second side surfaces of the first battery pack to receive said pair of engaging protruding portions of the supplementary pack; and wherein the supplementary battery pack assumes the first posture when the engaging protruding portions of the supplementary battery pack are fitted into the engaging recessed portions on the first side surface of the first battery pack, and assumes the second posture when the engaging protruding portions of the supplementary battery pack are fitted into the engaging recessed portions on the second side surface of the first battery pack.

20. A portable computer system according to claim 15, wherein:

the auxiliary engagement mechanism of said supplementary battery pack comprises arms each provided with a protruding portion at the inner side of one end portion thereof and the other ends of which are attached to both end surfaces of the supplementary battery pack;

the auxiliary engagement mechanism of said first battery pack has recessed portions formed on both side surfaces of the first battery pack, for receiving said protruding portions; and said supplementary battery pack moves from the first posture to the second posture or vice versa when said supplementary battery pack is rotated with respect to said first battery pack around said protruding portions and said recessed portions which are engaged with each other.

* * * * *